(No Model.)
W. F. BRADBURY.
TUBE CLEANER FOR CIRCULAR TUBES.
No. 533,112. Patented Jan. 29, 1895.
Fig. I.
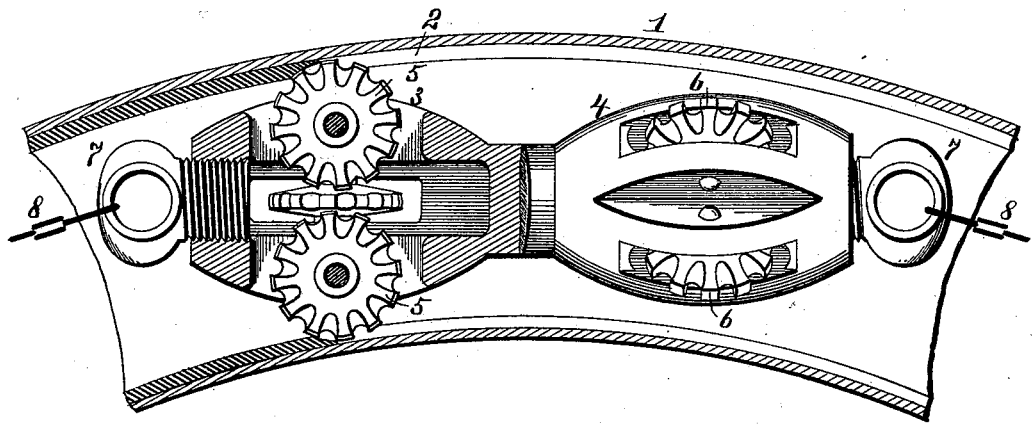
Fig. II.
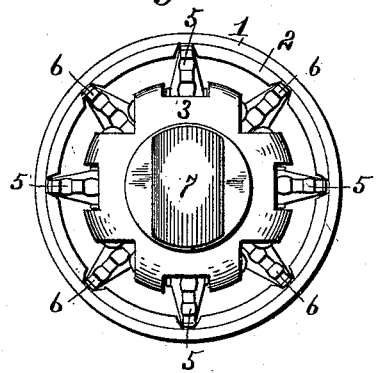
Witnesses:
F. G. Fischer
M. Fields
Inventor:
Wm F. Bradbury
By Knight Bros.
Attys.

UNITED STATES PATENT OFFICE.

WILLIAM F. BRADBURY, OF KANSAS CITY, MISSOURI.

TUBE-CLEANER FOR CIRCULAR TUBES.

SPECIFICATION forming part of Letters Patent No. 533,112, dated January 29, 1895.

Application filed May 5, 1894. Serial No. 510,203. (No model.)

*To all whom it may concern:*

Be it known that I, WILLIAM F. BRADBURY, of Kansas City, in the county of Jackson, in the State of Missouri, have invented certain new and useful Improvements in Tube-Cleaners for Circular Tubes, of which the following is a full, clear, and exact description, reference being had to the accompanying drawings, which are made a part of this specification.

My invention relates to certain new and useful improvements in tube cleaners especially adapted for cleaning circular tubes of the incrustation formed therein; and my invention consists in certain features of novelty hereinafter described and pointed out in the claims.

Figure I represents a longitudinal section of a circular tube showing a scale formed therein and my improved tube cleaner for circular tubes therein; showing, also a sectional view of one of the heads of the tube cleaner. Fig II represents an end view of such a tube showing the cutting rollers of one head alternating with the cutting rollers of the other head.

Similar numerals refer to similar parts throughout both the views.

1,— represents a section of a circular tube.

2,— represents the scale formed therein.

3, and 4,— represent rigid heads formed in a single piece.

5 and 6,— represent cutting rollers journaled in the heads, said cutting rollers 5 of one head alternating with the cutting rollers 6 of the other.

The cutting rollers I preferably use are the improved cutting rollers described in my application for Letters-Patent which was filed May 5, 1894, Serial No. 510,203, but I do not limit myself thereto as any form of cutting rollers may be used.

7,— represents eye bolts threaded into the ends of the rigid heads to which are attached the chains 8 or other suitable means whereby the tube cleaner is drawn through the tube.

My improved tube cleaner is especially adapted to circular tubes and the peculiar advantage I claim for my invention is, that by the use of the double head, one head acts as a guide to the other to direct and retain the cleaner true to the circular line of the tube which could not be done with a single head, the action being similar to the action of car trucks upon a curve.

A further advantage I claim is in the disposition of the cutting rollers. The cutting rollers have one head alternating with those of the other. Double the number of distinct grooves or furrows is formed in the scale than would be with the single head and with but little greater expenditure of power and with much less expenditure of power than if the same number of rollers were set in a single head.

Having thus fully described my improvement, what I claim as my invention, and desire to secure by Letters Patent, is—

1. A tube cleaner for circular tubes consisting of two heads formed rigidly in a single piece, cutting rollers unyieldingly journaled in each of said heads, said cutting rollers in one head alternating with the cutting rollers in the other head and means for drawing the same through the tube; substantially as shown and described and for the purpose set forth.

2. A tube cleaner for circular tubes consisting of two heads formed rigidly in a single piece, cutting rollers unyieldingly journaled in each of said heads, each head adapted to serve as a rigid abutment and guide for the other to direct and retain the device true to the circular line of the tube; substantially as shown and described and for the purpose set forth.

WILLIAM F. BRADBURY.

Witnesses:
M. O. FIELDS,
A. C. BROWN.